United States Patent
Burkes et al.

(10) Patent No.: US 6,915,353 B2
(45) Date of Patent: Jul. 5, 2005

(54) METHOD AND APPARATUS FOR AVOIDING UNNECESSARY COMPUTER PERIPHERAL CALIBRATION ACTIVITIES

(75) Inventors: Theresa A. Burkes, Meridian, ID (US); George Bernhard Clifton, Boise, ID (US); Steven Robert Folkner, Boise, ID (US); Angela Kay Hanson, Eagle, ID (US); Kenneth Joseph O'Hara, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 736 days.

(21) Appl. No.: 09/920,589

(22) Filed: Aug. 1, 2001

(65) Prior Publication Data

US 2003/0028691 A1 Feb. 6, 2003

(51) Int. Cl.⁷ ............................................. G06F 15/16
(52) U.S. Cl. ...................... 709/248; 709/220; 709/221; 709/222
(58) Field of Search ............................... 709/248, 224, 709/223, 220, 221, 222, 298

(56) References Cited

U.S. PATENT DOCUMENTS

| | | | | |
|---|---|---|---|---|
| 5,477,476 A | * | 12/1995 | Schanin et al. | 713/324 |
| 5,950,036 A | * | 9/1999 | Konishi | 399/8 |
| 6,160,968 A | * | 12/2000 | Noda | 399/8 |
| 6,237,032 B1 | * | 5/2001 | Scoville et al. | 709/221 |
| 6,280,105 B1 | * | 8/2001 | Iida | 400/74 |
| 6,415,387 B1 | * | 7/2002 | Aguilar et al. | 713/320 |
| 6,591,368 B1 | * | 7/2003 | Ryu | 713/323 |
| 6,594,767 B1 | * | 7/2003 | Wiley et al. | 713/300 |
| 6,609,210 B1 | * | 8/2003 | Onuma | 713/323 |
| 6,625,640 B1 | * | 9/2003 | Zou et al. | 709/200 |
| 6,697,254 B1 | * | 2/2004 | King et al. | 361/687 |
| 6,701,442 B1 | * | 3/2004 | Kunz et al. | 713/300 |

* cited by examiner

Primary Examiner—Saleh Najjar

(57) ABSTRACT

A method and apparatus for determining an appropriate recalibration duty cycle. The method instructs a network connected computer peripheral to access one or more servers to retrieve a timestamp. Retrieved timestamps are used to calculate the elapsed time since the last trigger-event (e.g., last calibration, printing activity, time of power-off, or the like). If the calculated elapsed time is less than a predetermined or dynamically determined threshold, the method instructs the peripheral to omit otherwise implemented calibration activities, e.g., a power surge reboot.

30 Claims, 2 Drawing Sheets

METHOD AND APPARATUS FOR AVOIDING UNNECESSARY COMPUTER PERIPHERAL CALIBRATION ACTIVITIES

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO AN APPENDIX

Not Applicable.

BACKGROUND OF THE INVENTION

1. Field of the Invention

The present invention relates generally to computer peripheral apparatus, such as hard copy machines, and more specifically to the use of Internet technology to obviate the need for on-board hardware to time calibration activities associated with operating such apparatus.

2. Background of the Invention

In the state of the art, computer peripherals—such as a hard copy apparatus—need periodic, automated, calibration, or re-calibration, to ensure proper operating functionality and other performance specifications are met—such as achieving design optimum print quality. (This invention relates to any networked instruments or computer related apparatus which require periodic re-calibration to optimize performance. To simplify the description of the present invention, a hard copy apparatus, more simply referred to as a "printer," implementation will be used as an exemplary embodiment hereinafter; no limitation on the scope of the invention is intended nor should any be implied.) A calibration program is built into each printer, usually in the form of firmware routines contained in on-board memory.

One specific equipment calibration subroutine, known as the "boot-up" routine, is readily recognized as it is programmed to run each time power to the equipment is cycled off-and-on again. However, in certain types of printers such as a laser printer, a specified range of operating temperatures of the print engine is required to maintain print quality optimums. At the same time, most printers employ a power saving mode—i.e., cycling to a quiescent "ready" but low power consumption state—after a given elapsed time following the current print job finishes. In this "ready" state, the temperature can fall out of the specified range. Therefore, if a subsequent print job has not occurred before the operating temperature drops too low, a warm-up cycle, or "reboot" recalibration," is required and automatically implemented before a commanded subsequent print job will actually be printed. In the state of the art, a temperature sensor or an internal clock and a battery power supply are provided for keeping track of temperature or elapsed time. Either solution adds cost to the product. Moreover, battery disposal is an environmentally sensitive problem, adding further cost for the manufacturer.

Other types of printers, for example, ink-jet devices, generally only need one service duty cycle once powered on. The pens are wiped and test fired in a built-in boot-up routine. Note that this means that a printer may needlessly execute a calibration on short ON-OFF power cycles or power interruptions. For example, a power spike may unintentionally reboot all office equipment on a particular circuit. Since calibration cycles generally usually prevent the end-user from accessing the full function of the printer while the cycle is in-progress, efficiency is compromised. Limited life ink-jet pen service station components are used up more rapidly.

As one solution, some temperature sensitive printers use a battery-operated or capacitor-backed clock on-board the printer to measure elapsed time through a power interruption. This again adds costs to the apparatus; a hardware clock requires software and firmware support. Extra logic is needed to ensure that the clock has the absolute time for the life of the printer. Extra firmware and software is needed to handle conditions like battery power levels or hardware failure modes. Other types of apparatus may use page counters, ink drop counters, thermistors, or the like to determine when to re-calibrate.

There is a need for a method and system for properly cycling re-calibration at specified times which is not reliant on on-board clocks, counters, or the like. Fulfilling this need will provide a more efficient use of printer functions and reduce piece part cost and potential maintenance requirements, such as replacing batteries, disposing of used batteries, and the like.

SUMMARY OF THE INVENTION

In a basic aspect, the present invention provides a method for cycling calibration operations of a networked computer peripheral, the method including: periodically monitoring at least one current timestamp service across a network connection; recording a first timestamp indicative of time of current trigger-event; using the first timestamp and current timestamp, calculating elapsed time since a last trigger-event; and re-running said calibration operations only when the elapsed time exceeds a pre-specified period for cycling operations. In another aspect, the present invention provides a computer peripheral comprising: a machine having a memory including a predetermined cyclical machine associated recalibration routine; and on-board said machine, a network interface coupling the machine to a network, an application for obtaining timestamps across said interface, and a routine for calculating elapsed time since running the predetermined cyclical recalibration routine using said timestamps. In another aspect, the present invention provides a computer memory having code for cycling calibration operations of a networked computer peripheral, the memory including: computer code periodically monitoring at least one current timestamp service across a network connection; computer code recording a first timestamp indicative of time of current calibration operation; using the first timestamp and current timestamp, computer code calculating elapsed time since a last trigger-event cycle; and computer code re-running said calibration operations only when the elapsed time exceeds a pre-specified period for cycling operations.

The foregoing summary is not intended to be an inclusive list of all the aspects, objects, advantages, and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Objects, features and advantages of the present invention will become apparent upon consideration of the following explanation and the accompanying drawings, in which like reference designations represent like features throughout the drawings. The drawings referred to in this specification should be understood as not being drawn to scale except if specifically annotated.

DETAILED DESCRIPTION OF THE INVENTION

Reference is made now in detail to a specific embodiment of the present invention, which illustrates the best mode presently contemplated by the inventors for practicing the invention. Alternative embodiments are also briefly described as applicable. The term "internet" used hereinafter generically refers to the Internet, World Wide Web, private intranets, and the like as are current to the state of the art. Network descriptions as used herein are intended to include both wired or wireless forms.

Figure 1:
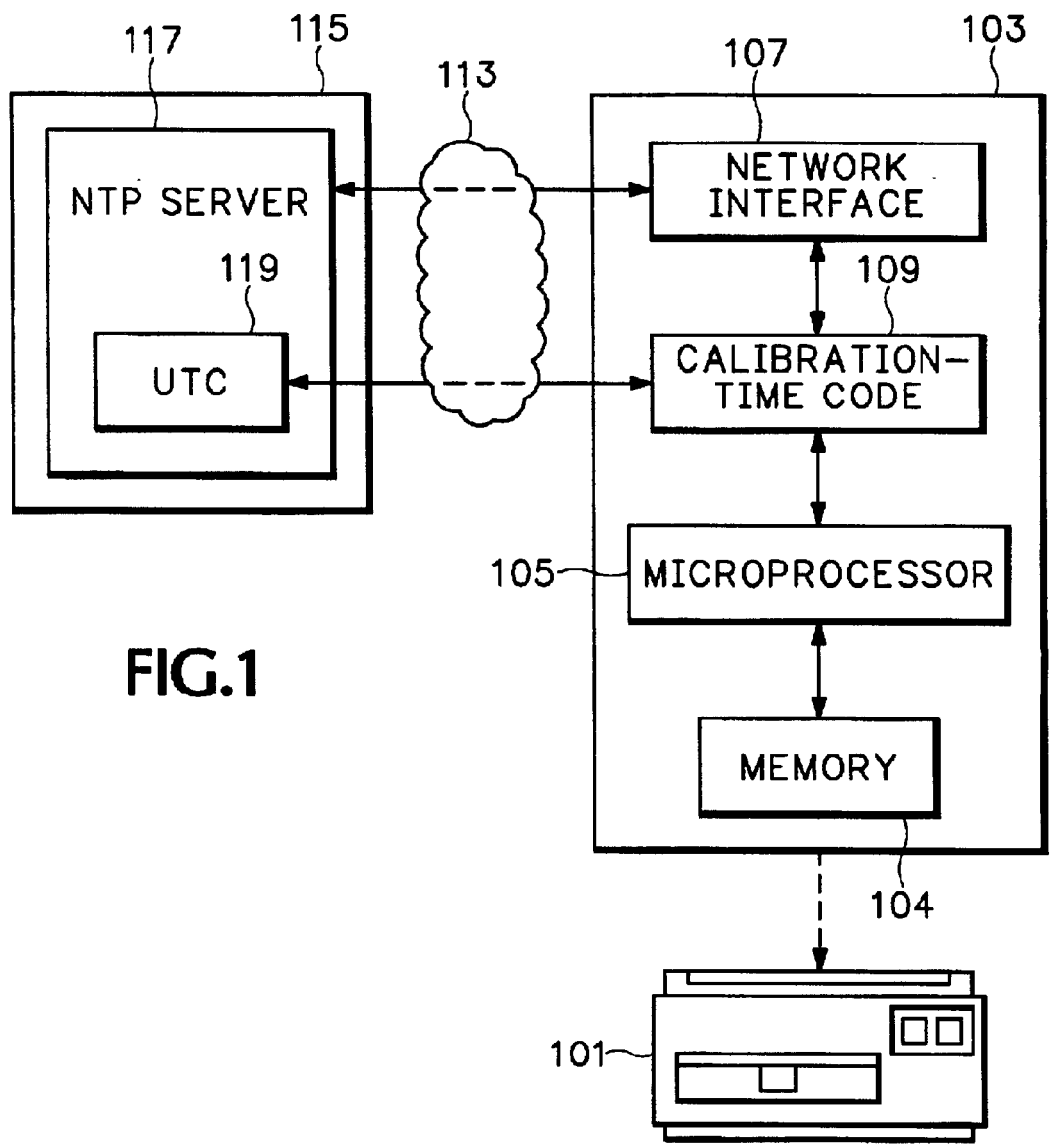
FIG. 1 is a schematic block diagram of apparatus in accordance with the present invention.

FIG. 1 demonstrates an exemplary computer peripheral, hard copy apparatus 101 (hereinafter "printer 101"), having an on-board (depicted by dashed arrow) controller-formatter printed circuit board 103 ("CFPCB 103" hereinafter). The CFPCB 103 is generally microprocessor 105 based, using known manner technology. Memory 104 and internet-type interface 107 subunits are included in the CFPCB 103 on-board the printer 101. In accordance with the present invention, the interface 107 is used by a calibration-time routine 109 associated with the apparatus' program routines (or hereinafter referred to simply as the "code") generally kept in memory 104. Note that application specific integrated circuit ("ASIC"), cache memory, and the like technology can be employed. The interface 107 is appropriately coupled to the internet, represented by a cloud 113 symbol.

On internet servers 115 at Universal Resource Identifier ("URI"; e.g., a Universal Resource Locator ("URL")) designated internet sites a current time stamp can be obtained. This is generally referred to in the art as computer network time synchronization. For example, one site at:
http://www.eecis.udel.edu/~ntp/ntp_spool/html/index.htm, describes a Network Time Protocol ("NTP"). NTP is proposed to use internet time to synchronize the time of a computer client or server to another server or reference time source, such as a radio or satellite receiver or modem. Other currently available time servers are the Simple Network Time Protocol ("SNTP"), TIME, DAYTIME, and the like, which may also be used in accordance with the present invention. In general, time at the server 115 is kept accurate relative to Coordinated Universal Time 119 ("UTC"; also known as Greenwich Mean Time" (see e.g., "What is Universal Time?" at http://aa.usno.navy.mil/AA/)) via global positioning services ("GPS"). A program from the U.S. Naval Observatory for linking to such a time service is found at:
http://tycho.usno.navy.mil/ctime.html.
For the purpose of understanding the present invention, no further detail is necessary other than to assume that in FIG. 1, the server 115 is one such local or remote time server where a UTC 119 or other current timestamp can be obtained using the internet 113 interface 107 on-board the printer 101. The calibration-time code 109 is programmed to periodically or continually monitor UTC 119 over the internet 113.

Figure 2:
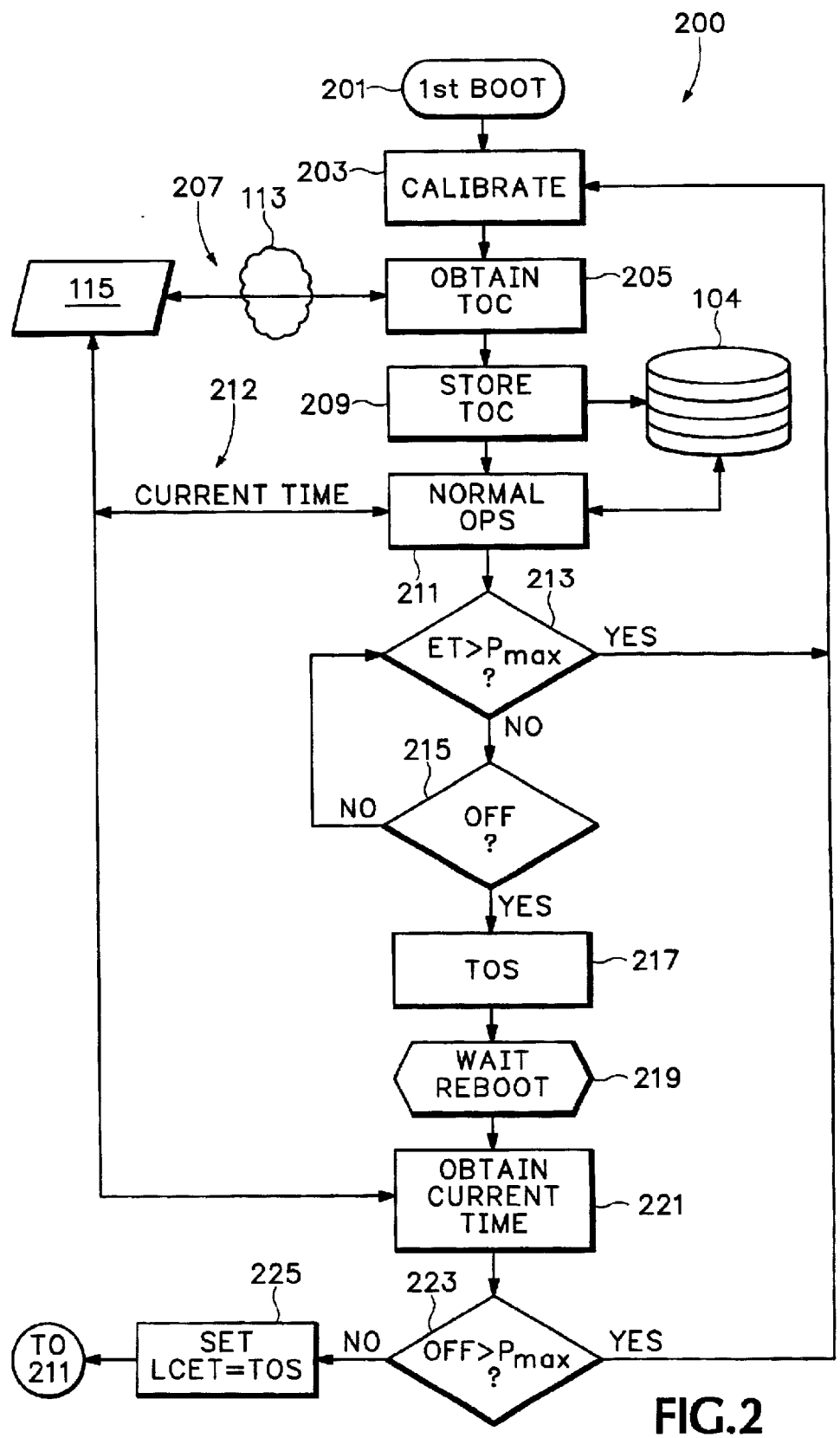
FIG. 2 is a flow chart demonstrating the method in accordance with the present invention.

The operation of the present invention is now described with respect to FIG. 2. FIG. 2 is a flow chart of the computer code process program 200 of the present invention. Referring simultaneously to FIG. 1 may help in understanding the present invention.

The printer 101 is provided with an calibration-time routine 109 for retrieving and tracking date and time over the internet 113 for determining when the microprocessor 105 should initialize a run of the on-board standard calibration routine 203 stored in the CFPCB memory 104.

On a very first power-on cycle 201 of the printer 101 following initial plug in and connection to a network, the calibration 203 routine is automatically implemented as with the prior art. At the finish of the calibration 203 routine, a current date and time (time of calibration, "TOC") obtained over the internet, step 205. The current date and time for this first TOC is stored, step 209, in memory 104. In the preferred embodiment for a laser printer, temperature is a function of time down; thus, what is stored periodically is time up. On a power cycle event, one can compute an approximate time down.

In other words, upon an indication that the first calibration routine 203 has successfully finished (if failed, it is known in the art to otherwise notify the user), the microprocessor 105 implements the calibration-time routine 109 to obtain the current date and time from at least one Time server 115 (multiple acquisitions can be used to ensure accuracy). Obtaining the current date and time from a time-type server 115 (e.g. UTC) over the internet 113 is generally represented as cloud symbol 207 in FIG. 2.

One specific embodiment of this calibration-time routine 109 is to execute a Java application on a Java Virtual Machine embedded in the memory 104. The calibration-time routine 109 retrieves the date and time information using a known manner protocol such as TCP/IP, UDP, or Hypertext Transfer Protocol ("HTTP"). The calibration-time routine 109 is programmed to try one or more servers 115 at predetermined addressable internet sites in either a predetermined or dynamically determined order. For greatest flexibility and accuracy, the calibration-time routine 109 requests date and time (hereinafter a "timestamp") in the format of UTC. Note that local time also can be used but is more complex to manage across time zones and with respect to time changes (e.g., to Daylight Savings Time and back). However, it is well-know how to translate local time to UTC given the time zone and change information. The printer 101 must be configured with this information in order to do the translation. The alternative is to ignore the local time variation if the calibration method can still be effective; then needing to tolerate negative elapsed time, larger time intervals, or the like.

Note that sites with firewalls can have a Time server hierarchy to access UTC time within the firewall. Such an Time server hierarchy enhances the security of the site by accurately time stamping log files and preventing playback of login/password interactions. NTP is available on UNIX, Linux, and Windows 2000; Windows NT supports it through "timeserv," a part of the Server Resource Kit.

Normal functional operations then proceed, step 211. During normal operations, it is known to recalibrate the printer 101 periodically in accordance with the manufacturer's specification (see Background section, supra). In a laser printer or other temperature sensitive equipment not equipped with expensive temperature monitoring devices, time versus temperature is the issue, viz., has the elapsed time since last operational printing ("LOP") exceeded a threshold indicating that the temperature will be to low to ensure design level print quality. Therefore, the elapsed time ("ET") since operational printing is monitored, step 213, namely, $$ET = \text{Current Time} - \text{Last Critical Event Time} \quad \text{(Equation 1)},$$

and a determination of, $$\text{"is } ET > P_{MAX}?\text{"} \quad \text{(Equation 2)},$$

where Last Critical Event Time is TOC or LOP and where "$P_{MAX}$" is the maximum period of operation pre-specified by the OEM before recalibration 203 is to be run (in a laser printer related to time since last print cycle, or in an ink-jet printer related to ink drop count, or the like suitable criteria for the computer peripheral of interest with which the present invention is employed). Current Time 212 is from a periodic or continual check of UTC 119 using the calibration-time routine 109. For example, if it is known that $P_{MAX} = T$, where T is the time lapse with respect to expected temperature drop in the power saving mode of a particular Hp™ LaserJet™ printer, the calibration-time routine 109 may check for example UTC every T/2 whereby $P_{MAX}$ is never exceeded by ½ of normal operations 211. In the current best mode implementation, UTC 119 is sampled every few hours and compared to any oscillating hardware acting as a time-keeper already on-board (e.g., CPU clock) to avoid too frequent, internet traffic downtime cycles. UTC is sampled periodically to correct drift (known in the art as "drift correction") due to using an on-board oscillating hardware to keep time while the printer is powered on. For this application, drift correction can be a matter of hours, depending on the on-board hardware.

Moreover, the calibration-time routine 109 may record a time stamp for each normal operation use, creating a log useful for other purposes beyond the recalibration scope of the invention (e.g., information technology department accounting and the like).

If an intentional or accidental power off condition occurs, step 215, Yes-path, the UTC current time 212 or last current time stamp stored in memory 104 becomes the time of shutdown ("TOS"), step 217. The printer 101 waits for a new power on cycle to occur, step 219.

As described in the Background section above, after any re-boot of the printer 101, in accordance with the prior art the printer would normally automatically recalibrate. In accordance with the present invention, prior to starting a calibration 203, the calibration-time routine 109 obtains the new current time from the Time server 115, step 221, as reboot time ("RT"). RT is compared to TOS and if the printer 101 was in the OFF condition greater than $P_{MAX}$, step 223, YES-path, then immediate calibration 203 is required to return to the normal operation state 211. If the printer 101 was not OFF for a time period greater than $P_{MAX}$, step 223, NO-path, then normal operations 211 can proceed, including monitoring ET 213, setting the Last Critical Event Time to TOS, step 225. Thus, when a power off condition occurs during normal operations of the peripheral, calculating elapsed time since a previous calibration operation in accordance with the equations:

$$(1)\ ET_{OFF} = (RT - TOS), \quad \text{(Equation 3)},$$

where TOS is the approximate time of power off condition, and RT is a timestamp indicative of a following power on condition, or $$(2)\ ET_{CAL} = (RT - TOC) \quad \text{(Equation 4)}, \text{ or}$$

$$(3)\ ET_{LOF} = (RT - LOP) \quad \text{(Equation 5)}.$$

Thus there are three cases: (1) the printer needs calibration based on elapsed time since shut down; (2) the printer needs calibration based on elapsed time since last calibration; or (3) the printer needs calibration based on the elapsed time since last operational printing. Pmax for each case is likely different.

In addition, a re-calibration threshold period criterion for a particular implementation—e.g., time versus temperature, page count, time count, drop count (or other heavy use criterion), time since another type of calibration, time since last scheduled maintenance, user-scheduled preference, or any like trigger-event criteria which can be quantified by a time stamp—may be implemented in accordance with specific embodiments wherein whenever the elapsed time ET exceeds the designed timed calibration period $P_{MAX}$, the process returns to the calibration cycle 203. A new TOC is obtained 205 and stored 209 so that normal operations 211 can proceed. Thus, in general:

$$ET = RT - TOTE \quad \text{(Equation 5)},$$

where TOTE is defined as the time of predetermined trigger-event.

Thus the present invention provides a method and apparatus for determining an appropriate calibration-recalibration 203 duty cycle. The method instructs a network 113 connected computer peripheral 101 to access one or more servers 115 to retrieve a timestamp 119. Retrieved timestamps are used to calculate the elapsed time. If the calculated elapsed time is less than a predetermined or dynamically determined threshold 123, the method instructs the peripheral 101 to omit otherwise implemented calibration activities, e.g., a power surge reboot.

Note that this internet timestamp methodology can be used in tandem with a clock on-board the printer, either serving as primary or backup, and used to set the on-board clock or correct for drift.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . " and no process step herein is to be construed under those provisions unless the step or steps are expressly recited using the phrase "comprising the step(s) of . . . ."

What is claimed is:

1. A method performed by a networked computer peripheral for cycling trigger-event operations of the networked computer peripheral, the method comprising:

periodically monitoring at least one current timestamp service across a network connection to obtain a current timestamp;

recording a first timestamp indicative of time of a current trigger-event operation;

using the first timestamp and current timestamp, calculating elapsed time since a last trigger-event operation; and re-running said trigger-event operation only when the elapsed time exceeds a pre-specified period for cycling operations.

2. The method as set forth in claim 1, said calculating further comprising: including accounting for any peripheral power-off time period.

3. The method as set forth in claim 1, said periodically monitoring further comprising: monitoring coordinated universal time from a network time protocol server.

4. The method as set forth in claim 1, comprising:

when no power-off condition occurs during operation of the peripheral, calculating elapsed time, ET, since a previous trigger-event operation in accordance with an equation:

$$ET=CT_R-TOTE,$$

where $CT_R$ is the current real time and TOTE is a recorded timestamp indicative of the trigger-event, and a determination:

is $ET>P_{MAX}$?, where $P_{MAX}$ is a maximum period of operation pre-specified before a predetermined action is to be performed.

5. The method as set forth in claim 1, comprising:

when a power off condition occurs during operation of the peripheral, calculating elapsed time since a previous trigger-event operation in accordance with an equation:

$$ET=RT-TOS,$$

where TOS is the approximate time of power off condition, and RT is a timestamp indicative of a following power on condition, and a determination:

is $ET>P_{MAX}$?

where $P_{MAX}$ is a maximum period of operation pre-specified before a predetermined action is to be performed.

6. The method as set forth in claim 1 wherein the trigger-event operation is recalibration of the computer peripheral.

7. The method as set forth in claim 6 wherein recalibration comprises performing a warm-up process on the computer peripheral.

8. The method as set forth in claim 6, wherein recalibration comprises wiping and test-firing ink pens of the computer peripheral.

9. The method as set forth in claim 1 wherein the computer peripheral is a printer.

10. A computer peripheral comprising:

a machine having a memory including a predetermined cyclical machine associated recalibration routine; and on-board said machine, a network interface coupling the machine to a network, an application for obtaining timestamps across said interface, and a routine for calculating elapsed time since running the predetermined cyclical recalibration routine using said timestamps.

11. The peripheral as set forth in claim 10 wherein said calculating includes accounting for time lapsed while said machine is in a power off condition.

12. The peripheral as set forth in claim 10 wherein the peripheral is a computer peripheral printer.

13. The peripheral as set forth in claim 10 wherein recalibration comprises performing a warm-up process on the computer peripheral.

14. The peripheral as set forth in claim 10 wherein recalibration comprises wiping and test-firing ink pens of the computer peripheral.

15. A computer memory having code for cycling calibration operations of a networked computer peripheral, the memory comprising:

computer code configured to periodically monitor at least one current timestamp service across a network connection to obtain a current timestamp;

computer code configured to record a first timestamp indicative of time of current calibration operation;

computer code configured to use the first timestamp and current timestamp to calculate an elapsed time since a last trigger-event cycle; and computer code configured to re-run said calibration on the computer peripheral only when the elapsed time exceeds a pre-specified period for cycling operations.

16. The memory as set forth in claim 15, said computer code configured to use the first and current timestamps further being configured to:

account for any peripheral power-off time period.

17. The memory as set forth in claim 15, said computer code configured to periodically monitor further being configured to:

monitor coordinated universal time from a network time protocol server.

18. The memory as set forth in claim 15, comprising:

when no power-off condition occurs during operation of the peripheral, computer code calculating elapsed time, ET, since a previous calibration operation in accordance with an equation:

$$ET=CT_R-TOTE,$$

where $CT_R$ is the current real time and TOTE is a recorded timestamp indicative of the trigger-event, and a determination:

is $ET>P_{MAX}$?, where $P_{MAX}$ is a maximum period of operation pre-specified before recalibration is to be run.

19. The memory as set forth in claim 15, comprising:

when a power off condition occurs during operation of the peripheral, computer code calculating elapsed time since a previous calibration operation in accordance with the equations:

$$ET=RT-TOS,$$

where TOS is the approximate time of power off condition, RT is a timestamp indicative of a following power on condition, and is $ET>P_{MAX}$?

where $P_{MAX}$ is a maximum period of operation prespecified before recalibration is to be run.

20. The memory as set forth in claim 15, the code for cycling calibration operations of a networked computer peripheral comprising: a Java application on a Java Virtual Machine.

21. The memory as set forth in claim 15 wherein the recalibration operation comprises a warm-up process performed on the computer peripheral.

22. The memory as set forth in claim 15 wherein the recalibration operation comprises wiping and test-firing ink pens of the computer peripheral.

23. A method for controlling recalibration of a printer, the method comprising:
   obtaining and storing a first timestamp upon completion of a predetermined action performed on the printer using a calibration time routine that executes on the printer;
   periodically obtaining and storing current timestamps using the calibration time routine; and
   controlling recalibration of the printer based upon the amount of time that has elapsed between the first timestamp and the current time stamps.

24. The method of claim 23, wherein the predetermined action comprises initial booting of the printer.

25. The method of claim 23, wherein the predetermined action comprises printing of a document.

26. The method of claim 23, wherein the predetermined action comprises performance of a calibration process.

27. The method of claim 23, wherein the predetermined action comprises performance of maintenance on the printer.

28. The method of claim 23, wherein the timestamps are obtained from a timestamp resource via a network communication.

29. The method of claim 23, wherein controlling recalibration comprises controlling warm-up of the printer.

30. The method of claim 23, wherein controlling recalibration comprises controlling wiping and test-firing of ink pens of the printer.

* * * * *